United States Patent
Lallement et al.

(10) Patent No.: US 11,505,011 B2
(45) Date of Patent: Nov. 22, 2022

(54) TIRE SUITABLE FOR RUNNING FLAT EQUIPPED WITH AN ELECTRONIC MEMBER

(71) Applicant: COMPAGNIE GENERALE DES ETABLISSEMENTS MICHELIN, Clermont-Ferrand (FR)

(72) Inventors: Philippe Lallement, Clermont-Ferrand (FR); Olivier Muhlhoff, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 175 days.

(21) Appl. No.: 16/467,437

(22) PCT Filed: Nov. 30, 2017

(86) PCT No.: PCT/FR2017/053324
§ 371 (c)(1),
(2) Date: Jun. 6, 2019

(87) PCT Pub. No.: WO2018/104623
PCT Pub. Date: Jun. 14, 2018

(65) Prior Publication Data
US 2019/0322142 A1    Oct. 24, 2019

(30) Foreign Application Priority Data
Dec. 7, 2016  (FR) ........................... 1662070

(51) Int. Cl.
*B60C 19/00*    (2006.01)
*B60C 17/00*    (2006.01)
*G06K 19/077*   (2006.01)

(52) U.S. Cl.
CPC .......... *B60C 19/00* (2013.01); *B60C 17/0009* (2013.01); *G06K 19/07764* (2013.01); *B60C 2019/004* (2013.01)

(58) Field of Classification Search
CPC .............. B60C 19/00; B60C 2019/004; B60C 17/0009; B60C 17/01; B60C 17/04;
(Continued)

(56) References Cited

U.S. PATENT DOCUMENTS

| 5,196,845 A | 3/1993 | Myatt |
| 6,326,925 B1 | 12/2001 | Perkio et al. |

(Continued)

FOREIGN PATENT DOCUMENTS

| CN | 1448284 A | 10/2003 |
| CN | 1953881 A | 4/2007 |

(Continued)

OTHER PUBLICATIONS

International Search Report dated Feb. 8, 2018, in corresponding PCT/FR2017/053324 (6 pages).

*Primary Examiner* — Robert C Dye
*Assistant Examiner* — Sedef E Paquette
(74) *Attorney, Agent, or Firm* — Venable LLP

(57) ABSTRACT

A tire suitable for running flat comprises a crown, two sidewalls and two beads, a carcass reinforcement with at least one carcass ply anchored in each bead and a sidewall insert placed axially internally relative to at least the carcass ply, wherein the tire is equipped with an electronic device comprising at least one radiofrequency transponder and wherein, each bead comprising a bead wire of revolution about a reference axis and H being one of the points of the bead wire closest to the axis of revolution, the electronic device is placed axially in a zone of the tire bounded by at least one of the beads and one of the sidewalls and radially (Continued)

externally at a radial distance larger than 20 mm from the point H.

11 Claims, 11 Drawing Sheets

(58) Field of Classification Search
CPC . B60C 17/08; B60C 2017/0072; B60C 11/24; B29D 30/0061; B29D 2030/0077; B29D 2030/0083; G06K 19/07764
USPC ........................................................ 152/517
See application file for complete search history.

(56) References Cited

U.S. PATENT DOCUMENTS

| | | |
|---|---|---|
| 6,546,982 B1 | 4/2003 | Brown et al. |
| 6,772,505 B1 | 8/2004 | Logan et al. |
| 6,836,253 B2 | 12/2004 | Strache et al. |
| 6,899,153 B1 | 5/2005 | Pollack et al. |
| 6,991,013 B2 | 1/2006 | Poulbot et al. |
| 7,084,750 B2 | 8/2006 | Johanning et al. |
| 7,102,499 B2 | 9/2006 | Myatt |
| 7,391,307 B2 | 6/2008 | Kuwajima |
| 7,453,407 B2 | 11/2008 | Logan et al. |
| 8,319,659 B2 | 11/2012 | Buck et al. |
| 8,593,357 B2 | 11/2013 | Myatt |
| 9,070,069 B2 | 6/2015 | Sinnett |
| 9,114,671 B2 | 8/2015 | Adamson et al. |
| 9,679,174 B2 | 6/2017 | Destraves et al. |
| 9,754,138 B2 | 9/2017 | Destraves et al. |
| 10,339,435 B2 | 7/2019 | Destraves |
| 11,018,406 B2 | 5/2021 | Destraves et al. |
| 11,152,684 B2 | 10/2021 | Destraves et al. |
| 11,264,698 B2 | 3/2022 | Destraves et al. |
| 11,295,193 B2 | 4/2022 | Destraves et al. |
| 2003/0085619 A1 | 5/2003 | Strache et al. |
| 2003/0217797 A1 | 11/2003 | Poulbot et al. |
| 2004/0252072 A1 | 12/2004 | Adamson et al. |
| 2006/0208863 A1 | 9/2006 | Kuwajima |
| 2007/0103285 A1 | 5/2007 | Konno et al. |
| 2007/0227644 A1 | 10/2007 | Fagot-Revurat et al. |
| 2008/0289736 A1 | 11/2008 | Adamson et al. |
| 2009/0058625 A1 | 3/2009 | Suzuki et al. |
| 2010/0122757 A1 | 5/2010 | Lionetti et al. |
| 2010/0123584 A1 | 5/2010 | Lionetti et al. |
| 2010/0176969 A1 | 7/2010 | Buck et al. |
| 2011/0175778 A1 | 7/2011 | Myatt |
| 2012/0291936 A1 | 11/2012 | Lionetti et al. |
| 2013/0153669 A1 | 6/2013 | Sinnett |
| 2015/0217602 A1 | 8/2015 | Salgues et al. |
| 2015/0239301 A1* | 8/2015 | Vallet ....................... D02G 3/48 152/517 |
| 2016/0107490 A1* | 4/2016 | Randall ............... B60C 15/0018 152/510 |
| 2016/0176247 A1 | 6/2016 | Cheikh et al. |
| 2017/0341323 A1 | 11/2017 | Destraves et al. |
| 2018/0174015 A1 | 6/2018 | Destraves |
| 2018/0264898 A1 | 9/2018 | Lallement et al. |
| 2019/0341673 A1 | 11/2019 | Destraves |
| 2020/0062050 A1 | 2/2020 | Destraves |
| 2020/0067171 A1 | 2/2020 | Destraves |
| 2020/0070598 A1 | 3/2020 | Noel |
| 2020/0079159 A1 | 3/2020 | Destraves |
| 2020/0247193 A1* | 8/2020 | Nakajima ............... B60C 19/00 |

FOREIGN PATENT DOCUMENTS

| | | |
|---|---|---|
| CN | 101279574 A | 10/2008 |
| CN | 101734112 A | 6/2010 |
| CN | 101801692 A | 8/2010 |
| CN | 103068598 A | 4/2013 |
| DE | 10 2007 043 077 A1 | 3/2009 |
| EP | 1310386 A2 | 5/2003 |
| EP | 1 619 052 A1 | 1/2006 |
| EP | 1 977 912 A1 | 10/2008 |
| EP | 2524818 A2 | 11/2012 |
| FR | 2 936 185 A1 | 3/2010 |
| JP | 2010-176454 A | 8/2010 |
| JP | 2011-195046 A | 10/2011 |
| JP | 2016-37236 A | 3/2016 |
| JP | 2016-49920 A | 4/2016 |
| WO | 2005/113262 A1 | 12/2005 |
| WO | 2012/030321 A1 | 3/2012 |
| WO | 2014/049058 A1 | 4/2014 |
| WO | 2016/193457 A1 | 12/2016 |

* cited by examiner

TIRE SUITABLE FOR RUNNING FLAT EQUIPPED WITH AN ELECTRONIC MEMBER

FIELD OF THE INVENTION

The present invention relates to a tyre suitable for running flat and equipped with an electronic device.

PRIOR ART

For several years, tyre manufacturers have sought to eliminate the need for the presence of a spare wheel on board the vehicle while at the same time guaranteeing that the vehicle will be able to continue its journey despite a significant or complete loss of pressure from one or more of the tyres. This, for example, allows a service centre to be reached without the need to stop, under circumstances that are often hazardous, in order to fit the spare wheel.

One envisaged solution is the use of run-flat tyres which are provided with self-supporting sidewalls (sometimes referred to by their trade designations "ZP" for "zero pressure" or "SST" for "self supporting tyre").

A run-flat tyre comprising a crown comprising a crown reinforcement, which reinforcement is formed of two crown plies of reinforcing elements and surmounted by a tread, is known from the prior art. Two sidewalls extend the crown radially inwards. These sidewalls are reinforced by rubber inserts that are able to support a load at reduced pressure or even with no pressure.

The tyre further comprises two beads each one comprising a bead wire and a carcass reinforcement extending from the beads through the sidewalls to the crown and comprising at least one carcass ply of reinforcing elements. The carcass ply is anchored to each of the beads via a turn-up about the bead wire.

When the inflation pressure is significantly reduced in comparison with the service pressure, or is even zero (this is then referred to as "run-flat" mode), the tyre must make it possible to cover a given distance at a given speed. This performance, referred to as "ERM" (extended running mode) performance, is required by legislation or by motor vehicle manufacturers in order to allow the producer to advertise the tyre as being a run-flat tyre.

When the inflation pressure is close to the service pressure (this is then referred to as "normal running" mode), it is desirable for the tyre to exhibit performance, referred to as "IRM" (inflated running mode) performance, that is as high as possible. This IRM running performance includes, amongst other things, the mass, the rolling resistance or even the comfort.

Furthermore, it is advantageous to equip tyres with electronic identification devices such as radiofrequency transponders or RFID (Radio Frequency IDentification) tags that allow them to be identified and tracked during the manufacture thereof, the storage thereof, the entirety of the lifetime thereof and also during retreading thereof.

The tyres in question are tyres for heavy goods vehicles, passenger vehicles, construction equipment, agricultural machinery, and aeroplanes.

Such electrical devices may be radiofrequency transponders or radiofrequency identification (RFID) tags.

These electronic devices must be placed very precisely in order to guarantee good radiofrequency communication, an acceptable device lifetime and in order not to penalize the operation or the endurance of the tyres.

The particular conditions of use of tyres able to run flat when running flat makes it particularly difficult to introduce such electronic devices into these types of tyres.

BRIEF DESCRIPTION OF THE INVENTION

The subject of the invention is a tyre suitable for running flat, the tyre comprising a crown, two sidewalls and two beads, a carcass reinforcement with at least one carcass ply anchored in each bead and a sidewall insert placed axially internally relative to at least the carcass ply. This tyre is characterized in that it is equipped with an electronic device comprising at least one radiofrequency transponder and in that, each bead comprising a bead wire of revolution about a reference axis and H being one of the points of said bead wire closest to the axis of revolution, the electronic device is placed axially in a zone of the tyre bounded by at least one of the beads and one of the sidewalls and at a radial distance larger than 20 mm from the point H, preferably smaller than 50 mm and very preferably at a radial distance comprised between 30 and 40 mm from the point H.

This position makes it possible to guarantee the quality of the electromagnetic communication with a receiver external to the tyre. The wheel on which the tyre is mounted is in general made of metal and a position too close thereto could disrupt the communication. It will be noted that the height of conventional rim flanges is 17.5 mm and beyond a radial distance of 20 mm from the point H, the electromagnetic disruption of the rim flange becomes minimal.

Furthermore, it is preferable to not place the electronic device in the median zone of the sidewall of the tyre because it is this zone of the sidewall that is most mechanically stressed in use and most liable to undergo curb scrapes.

In particular, a communication frequency of the electronic device is located in the ultra-high-frequency (UHF) band comprised between 300 MHz and 3 GHz, allowing an advantageous compromise to be obtained between the size of the radiating antenna, which may be small, allowing the antenna to be easily integrated into a tyre casing, and the distance from which the electronic device is readable, this distance possibly being far from the tyre casing. Advantageously, the electronic device communicates in the narrow frequency band comprised between 860 MHz and 960 MHz and more specifically in the very narrow bands of 860 MHz to 870 MHz and 915 MHz to 925 MHz. Specifically, at these frequencies, for the conventional elastomer blends of tyre casings a good compromise is reached with respect to propagation of the electromagnetic waves. In addition, these frequencies are the highest possible in order to minimize the size of the radiating antenna and thus facilitate integration of the electronic device into the tyre casing.

According to another preferred embodiment, each bead comprising a bead wire of revolution about a reference axis, the carcass reinforcement comprising a carcass ply with a turn-up about each of the bead wires and the turn-up having an axially external end, the electronic device is placed radially externally at a radial distance larger than 5 mm and preferably 10 mm from said axially external end of one of the turn-ups.

This makes it possible to distance the electronic device from the mechanical singularity related to the stiffness difference between the axially external end of the reinforcers of the carcass ply and the adjacent rubber blends.

According to another preferred embodiment, each bead comprising a bead wire of revolution about a reference axis and a filling rubber extending radially externally relative to the bead wire, the carcass reinforcement comprising a carcass ply with a turn-up about each of the bead wires and the filling rubber extending radially beyond the axially external end of the turn-up, the electronic device is placed axially externally relative to the carcass reinforcement and radially at a distance larger than 5 mm and preferably 10 mm from the radially external end of the filling rubber.

This makes it possible to distance the electronic device from the mechanical singularity related to the stiffness difference between the end of the filling rubber and the adjacent blends.

According to another preferred embodiment, each bead comprising a bead wire of revolution about a reference axis, a first and a second filling rubber extending radially externally relative to the bead wire, the second filling rubber being placed axially externally relative to the first, the carcass reinforcement comprising a carcass ply with a turn-up about each of the bead wires and extending radially between said first and second filling rubber, the electronic device is placed axially externally relative to the second filling rubber.

Preferably, the sidewall comprising a sidewall rubber placed at least partially axially externally relative to the second filling rubber, the electronic device is placed at the interface between the sidewall rubber and the second filling rubber.

On account of the low stiffness of the sidewall rubber, this position makes it possible to fully benefit from the better mechanical resistance of the electronic device to deformations undergone by this sidewall rubber in use and particularly when running flat.

According to another preferred embodiment, the bead comprising a protector rubber able to make contact with the surface of a rim placed radially internally relative to the bead wire and extending on either side thereof to two radially external ends, the axially external end of the protector rubber extending radially beyond the radially internal end of the second filling rubber, the electronic device is placed between the protector rubber and the filling rubber.

According to another preferred embodiment, the sidewall comprising a sidewall rubber and the bead comprising a protector rubber able to make contact with the surface of a rim placed radially internally relative to the bead wire and extending on either side thereof to two radially external ends, the axially external end of said protector rubber placed axially internally relative to the sidewall rubber and extending radially beyond the radially internal end of the sidewall rubber, the electronic device is placed between the sidewall rubber and the protector rubber.

According to another preferred embodiment, the electronic device is placed at the interface between the sidewall insert and an adjacent rubber blend.

The electronic device may thus be placed axially internally relative to the sidewall insert, at the interface between the insert and the inner liner.

It may thus be placed axially externally relative to the sidewall insert, at the interface between the insert and a carcass ply of the carcass reinforcement.

Advantageously, the sidewall insert has a maximum thickness comprised between 6 and 16 mm.

The electronic device may consist of a radiofrequency transponder. It may also consist of a radiofrequency transponder encapsulated in an electrically insulating encapsulating rubber mass.

Thus, the electronic device is interrogated from externally to the electronic device, passively. Thus, the phases of interrogation of the electronic device do not require the electronic device to have its own power supply. The role of the radiofrequency transponder is mainly to identify the tyre casing.

It is necessary for correct radiofrequency operation of the radiating antenna of the electronic device, for said antenna to be embedded in a mass of electrically insulating encapsulating rubber. It is thus possible to use a semi-finished element consisting of a radiofrequency transponder embedded in a mass of electrically insulating rubber to place it into the structure of the tyre during its manufacture in the chosen place.

However, it is also possible to directly place the radiofrequency transponder between two blends of the tyre when said blends, because of their formulation, are electrically insulating.

Preferably, the elastic modulus of the encapsulating rubber mass is lower than or equal to the elastic modulus of the adjacent rubber blends.

According to another aspect, the relative dielectric constant of the encapsulating rubber mass is lower than the relative dielectric constant of the adjacent rubber blends.

The radiofrequency transponders conventionally comprise an electronic chip and a radiating antenna able to communicate with an external radiofrequency reader.

According to a first embodiment, the radiating antenna comprising two helical antenna segments, and the electronic chip is galvanically connected to the two helical antenna segments.

According to another embodiment, the radiofrequency transponder in addition comprises a primary antenna electrically connected to the electronic chip, wherein the primary antenna is inductively coupled to the radiating antenna, and wherein the radiating antenna is a dipole antenna consisting of a single-strand helical spring.

This second embodiment has the advantage of mechanically disassociating the radiating antenna from the electronic components of the transponder and thus of avoiding the weak point of conventional transponders, namely the zone in which the antenna segments are fastened to the carrier of the electronic chip. The integration of such an electronic device into a tyre allows the risk of deterioration of the device, because of its structure, to be decreased while improving radiocommunication performance and minimizing the related risks to the physical integrity of the tyre.

Specifically, deterioration of the electronic device is generally caused by failures in the electrical connections that exist between the communication radiating antenna and the electronic portion of the device. Here, no mechanical connection is required since the transfer of energy between the communication antenna and the electronic chip is achieved with an electromagnetic field, via a primary antenna. However, although the size of the radiating antenna, which is related to the frequency band of communication and to its far-field operation, is by nature large, the primary antenna is not subjected to this constraint. Thus it is of smaller size, in general allowing the deformations of the tyre to be easily endured without generation of excessively high mechanical stresses within the galvanic junction between it and the electronic chip. Lastly, the supple nature of the radiating antenna limits the risks of the deterioration of the zone of the tyre close to the transponder.

Secondly, the introduction of the primary antenna makes it possible to disassociate contradictory constraints on the size of the radiating antenna and the electrical impedance of the electronic portion of the device. Thus, it is possible to dimension the primary antenna in order to match its electrical impedance to that of the chip in order to minimize losses and to therefore improve the performance of the electronic device in terms of power consumption. The dimensions of the radiating antenna are then chosen solely with respect to the criterion of the communication frequency of the electronic device. All of this tends to improve the radiocommunication performance of the electronic device.

According to one preferred embodiment, the radiating antenna defining a first longitudinal axis, the primary antenna is a coil having at least one turn defining a second longitudinal axis that is circumscribed in a cylinder the axis of revolution of which is parallel to the second longitudinal axis and the diameter of which is comprised between one third and three times, and preferably between half and two times, the average diameter of the helical spring of the radiating antenna.

Thus, the primary antenna being a loop antenna, energy is mainly transferred between the radiating antenna and the primary antenna by inductive coupling. This requires a certain proximity (in order to limit the gap between the two antennas) between the two antennas, requiring the coil of the primary antenna to be dimensioned, with respect to the radiating antenna, in order to ensure a transfer of energy that is sufficiently effective to obtain the desired radiocommunication quality. Concretely, the primary antenna may advantageously be of diameter smaller than that of the radiating antenna; in this case the entirety of the electronic portion of the transponder is inserted into the radiating antenna and the assembly is then particularly robust in an environment such as that of a tyre.

The antenna may also be of diameter larger than that of the radiating antenna; this case is particularly advantageous when it is desired to add, to the radiofrequency transponder, other, active or passive, electronic components in order to allow additional functions, such as for example surveillance of the state of the tyre, to be added.

According to one advantageous embodiment, the radiating antenna having a central zone between two lateral zones and the primary antenna having a median plane perpendicular to the second longitudinal axis, the first and second longitudinal axes are parallel to each other and the median plane of the primary antenna is placed in the central zone of the radiating antenna.

The term "central zone" is here understood to mean the cylinder defined by the inside diameter of the helical spring located on either side of the median plane of the helical spring and the height of which corresponds to 25% of the length of the helical spring, and preferably to 15% of the length of the helical spring.

Thus, it is ensured that the distance between the radiating and primary antennas is constant along the longitudinal axes of these antennas, thus optimizing level with each element of length of the primary antenna an equivalent transfer of energy. In addition, the magnetic field created by a coil through which an electric current flows being maximum at the centre of the length of the coil (in the case of a η/2 antenna), it is preferable to place the median plane of the primary antenna in the central zone of the radiating antenna and more preferably at the centre thereof in order to maximize the magnetic field that is the origin of the inductive coupling.

Preferably, in the case of a tyre able to run flat, the primary antenna is placed in the interior of the single-strand helical spring of the radiating antenna.

DESCRIPTION OF THE FIGURES

The various subjects of the present invention will be better understood by means of the following detailed description and the attached drawings, the same reference numbers having been used in all the drawings to reference identical parts, and in which drawings.

DETAILED DESCRIPTION OF THE INVENTION

Figure 1:
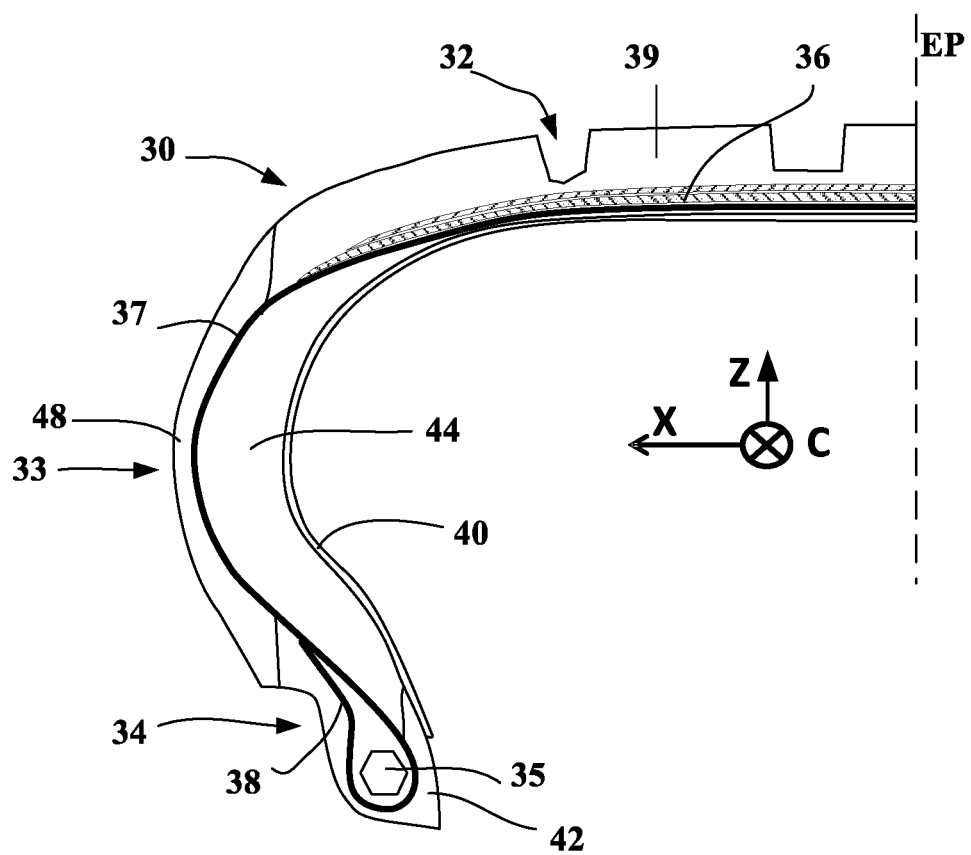
FIG. 1 illustrates in partial axial cross section a tyre able to run flat.

FIG. 1 indicates the axial X, circumferential C and radial Z directions and also the median plane EP (plane perpendicular to the axis of rotation of the tyre which is situated halfway between the two beads of the tyre and passes through the middle of the crown reinforcement) and the axis of rotation XX of the tyre 30.

In all the figures, the tyre is shown free, not mounted on a rim and such that the width between the two beads is decreased to the width of the nominal ETRTO rim.

As regards the axial direction, what is meant by "axially external" is an axial direction directed toward the exterior of the tyre and by "axially internal" what is meant is an axial direction directed toward the median plane EP of the tyre.

This run-flat tyre 30 comprises a crown 32 reinforced by a crown reinforcement or belt 36, a sidewall 33 and a bead 34, the bead 34 being reinforced with a bead wire 35. The crown reinforcement 36 is surmounted radially externally by a rubber tread 39. A carcass reinforcement 37 is wound around the bead wire 35 in the bead 34, the turn-up 38 of this reinforcement 37 being, for example, arranged towards the exterior of the tyre 30. In a manner known per se, the carcass reinforcement 37 is made up of at least one ply reinforced by what are known as "radial" cords, for example here of textile, that is to say that these cords are disposed virtually parallel to one another and extend from one bead to the other so as to form an angle of between 80° and 90° with the median circumferential plane EP. An airtight inner liner 40 extends from one bead to the other radially internally with respect to the carcass reinforcement 37. The bead 34 comprises a protective rubber 42 able to make contact with the surface of a rim. It also comprises a first filling rubber 46 extending radially externally relative to the bead wire 35.

The tyre 30 is able to run flat because of the presence of a sidewall insert 44 placed axially internally relative to the carcass reinforcement 33. This insert 44 allows the structure of the tyre to withstand the load thereon at zero pressure.

Figure 2:
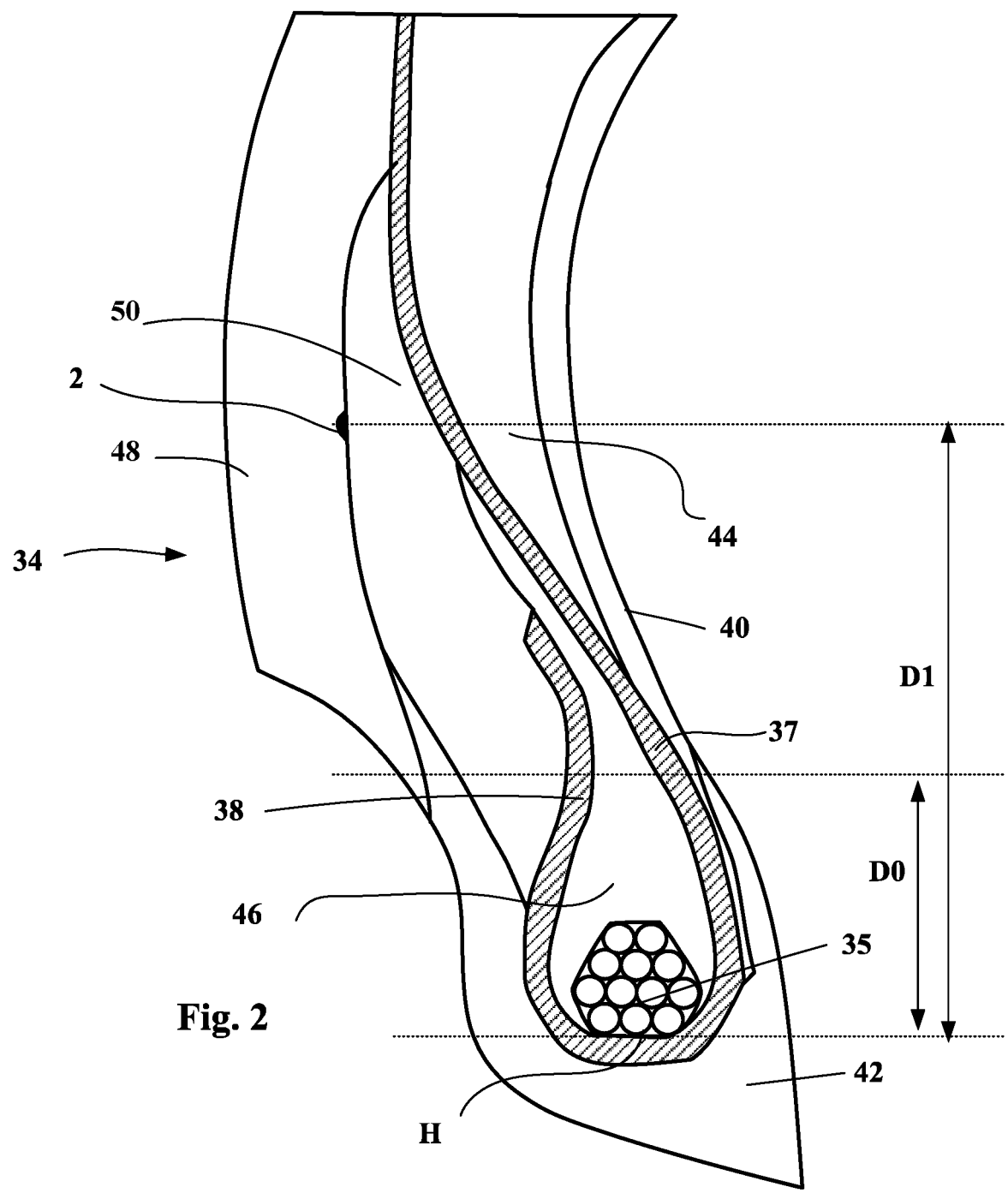
FIGS. 2 to 7 and 13 illustrate in axial cross section various embodiments of the zone of the tyre bounded by the bead and the sidewall comprising an electronic device placed in the structures thereof.

FIG. 2 shows a bead 34 and a portion of a sidewall of a tyre, the sidewall comprising at least one portion of a sidewall rubber 48, able to run flat according to a first embodiment of the invention. In the architecture of the tyre of FIG. 2, the radially internal end of the sidewall rubber 48 with respect to the axis of rotation is anchored in the bead 34 of the tyre.

This bead 34 comprises, in addition the bead of the tyre of FIG. 1, a second filling rubber 50 placed axially externally relative to the first filling rubber 46. The turn-up 38 of the carcass ply 37 lies between the two filling rubbers 46 and 50.

The zone of the tyre, bounded by the bead 34 and the portion of the sidewall, of FIG. 2, comprises an electronic device 2 placed at a radial distance D1 from the point H. The point H is one of the points closest to the axis of rotation XX. The distance D1 must be larger than D0 equal to 20 mm in order not to penalize the communication quality between the electronic device and an external reader. This distance is larger than the height of a conventional rim flange, which is 17.5 mm. This distance D1 must not be too high in order not to reach the middle of the sidewall where the mechanical stresses on the sidewall are very high. A distance of 30 to 40 mm is a good compromise.

Figure 3:
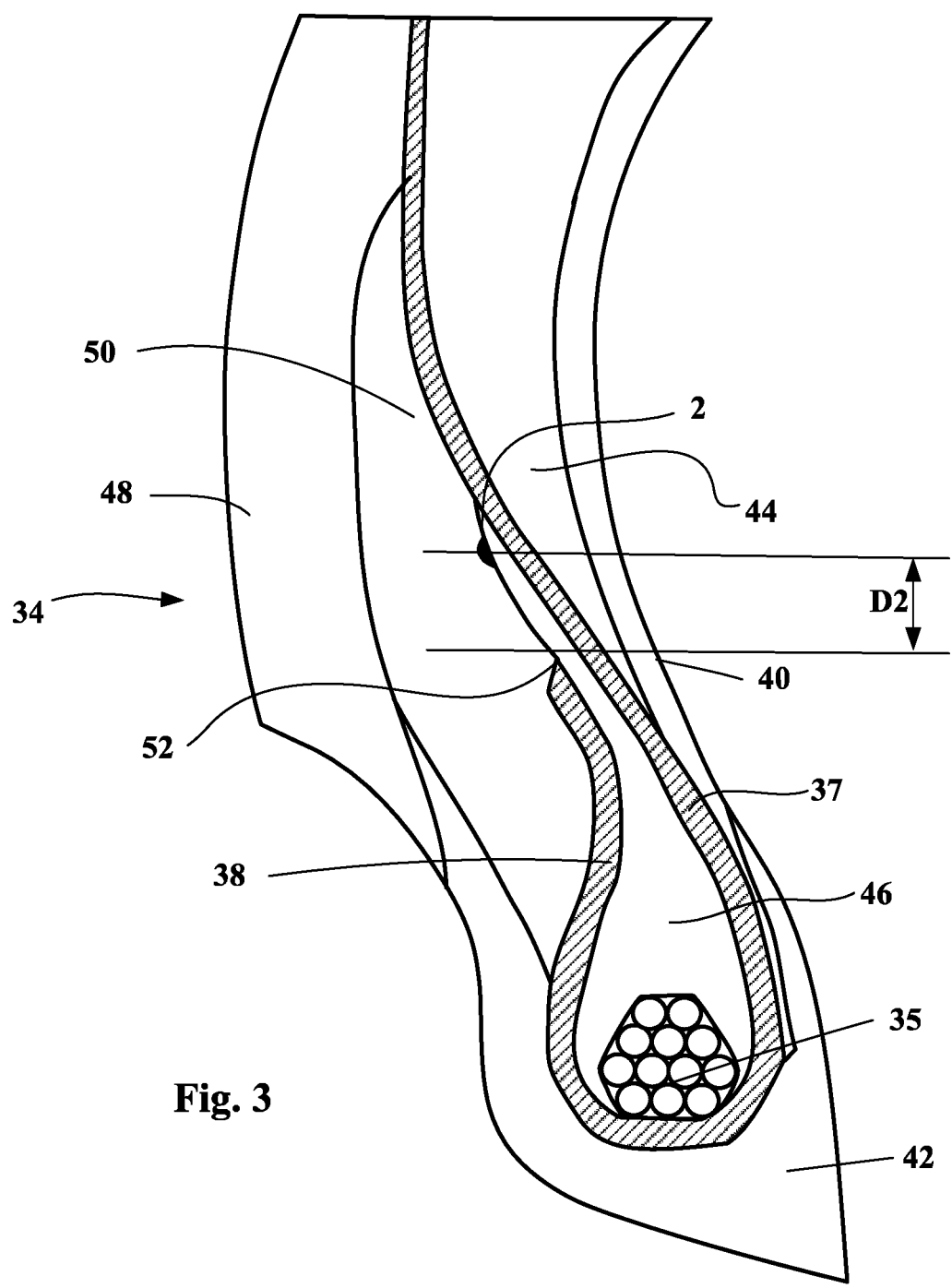

FIG. 3 shows a bead 34 and one portion of a sidewall of a run-flat tyre, the structure of which is identical to that of the bead and of the portion of the sidewall of FIG. 2. The end of the turn-up 38 of the carcass ply 37 is referenced 52.

The bead and the sidewall portion of FIG. 3 comprise an electronic device 2 placed radially externally at a radial distance D2 from the end 52 of the turn-up. This distance D2 is larger than 5 mm and preferably larger than 10 mm in order to distance the electronic device from the mechanical singularity related to the edge of the turn-up of the carcass ply. In the presented example, the electronic device 2 is placed at the interface between the first filling rubber 46 and the second filling rubber 52.

Figure 4:
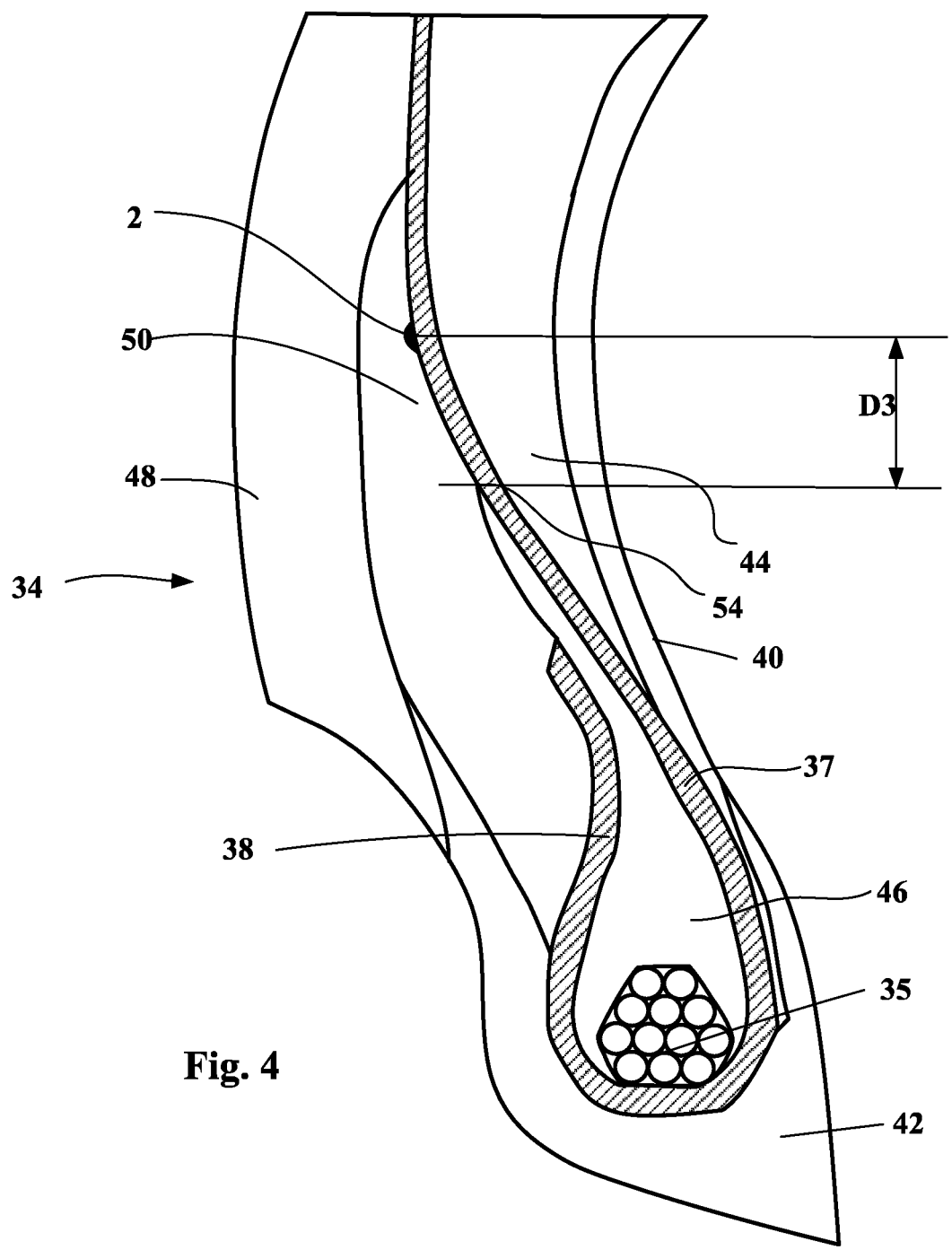

FIG. 4 shows a bead 34 and one portion of a sidewall of a run-flat tyre, the structure of which is identical to that of the bead and of the portion of the sidewall of FIG. 2. The radially external end of the first filling rubber 46 is referenced 54.

The zone of the tyre, bounded by this bead and this portion of the sidewall, of FIG. 4 comprises an electronic device 2 placed radially externally at a radial distance D3 from the end 54 of the first filling rubber. This distance D3 is larger than 5 mm and preferably larger than 10 mm in order to distance the electronic device from the mechanical singularity related to the edge of the first filling rubber 46. In the presented example, the electronic device 2 is placed at the interface between the carcass ply 37 (more precisely, during the calendar rolling of this carcass ply there is no direct contact between the electronic device and the reinforcing wires of the carcass ply) and the first filling rubber 46.

Figure 5:
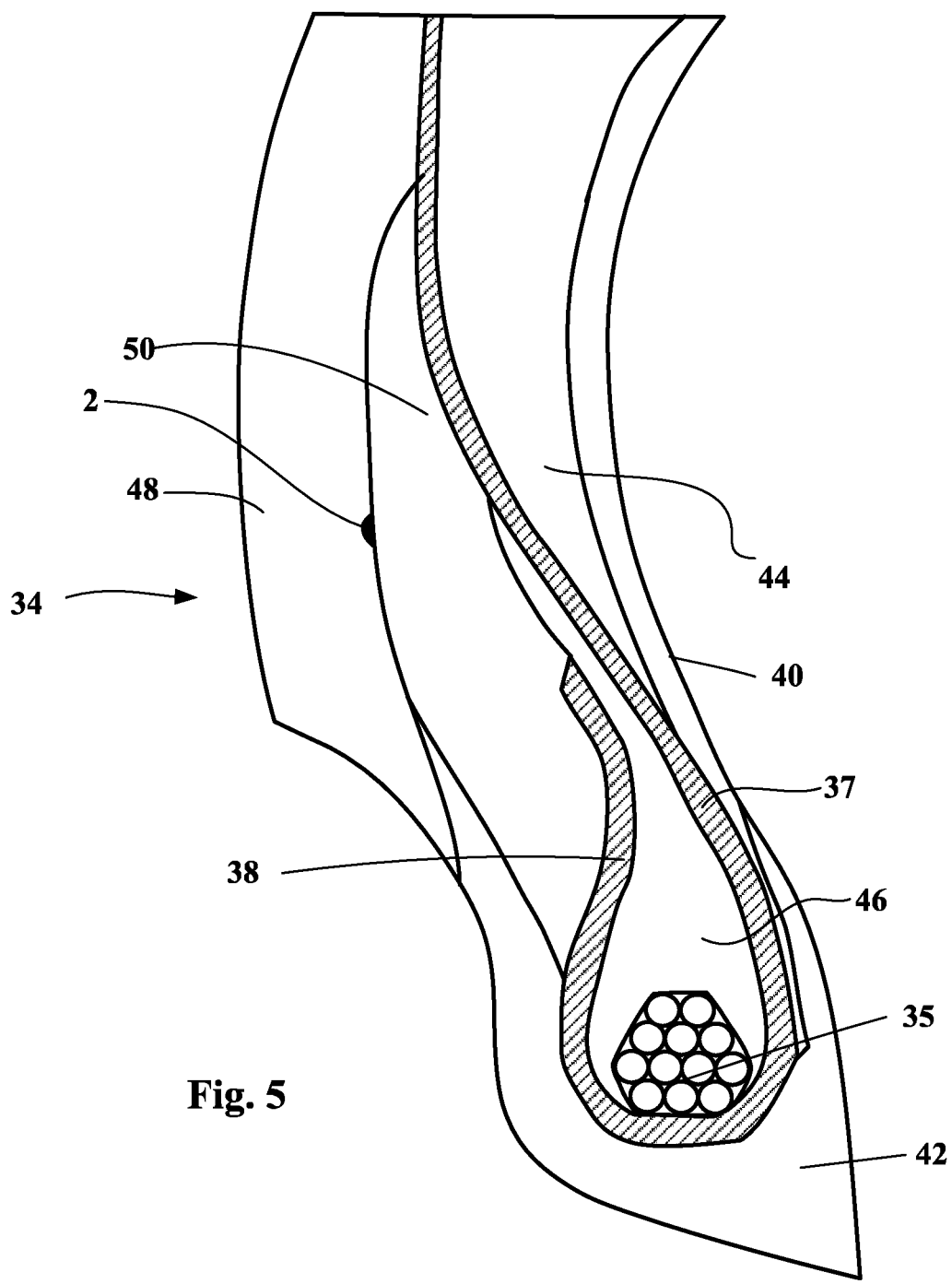

FIG. 5 shows a bead 34 and one portion of a sidewall of a run-flat tyre, the structure of which is identical to that of the bead and of the portion of the sidewall of FIG. 2.

The zone of the tyre, bounded by this bead and this portion of the sidewall, of FIG. 5 comprises an electronic device 2 placed axially internally relative to the second filling rubber 50. In the presented example, the electronic device 2 is placed at the interface between the sidewall rubber 48 and the second filling rubber 50. This position is advantageous because it axially distances the electronic device from the sidewall insert 44, which is the zone that gets hottest in case of flat running.

Figure 6:
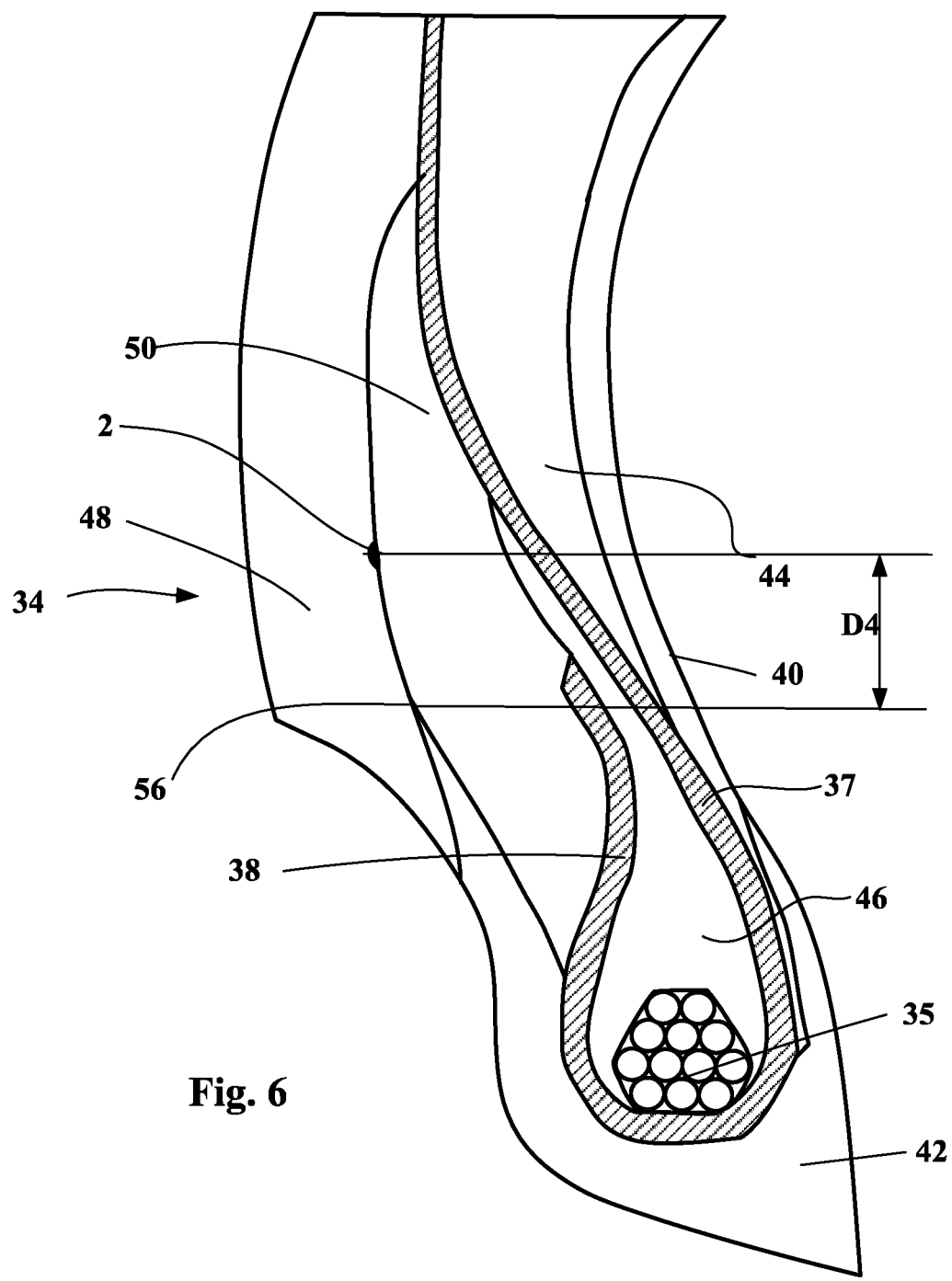

FIG. 6 shows a bead 34 and one portion of a sidewall of a run-flat tyre, the structure of which is identical to that of the bead and of the portion of the sidewall of FIG. 2. The radially and axially external end of the protector rubber 42 is referenced 56.

The zone of the tyre, bounded by this bead and this portion of the sidewall, of FIG. 6 comprises an electronic device 2 placed radially externally at a radial distance D4 from the radially and axially external end of the protector rubber 42, which is referenced 56. This distance D4 is larger than 5 mm and preferably larger than 10 mm in order to distance the electronic device from the mechanical singularity associated with the edge of the protector rubber 42 because of the difference in stiffness between the protector rubber and the sidewall rubber 48. In the presented example, the electronic device 2 is placed at the interface between the second filling rubber 50 and the sidewall rubber 48.

Figure 7:
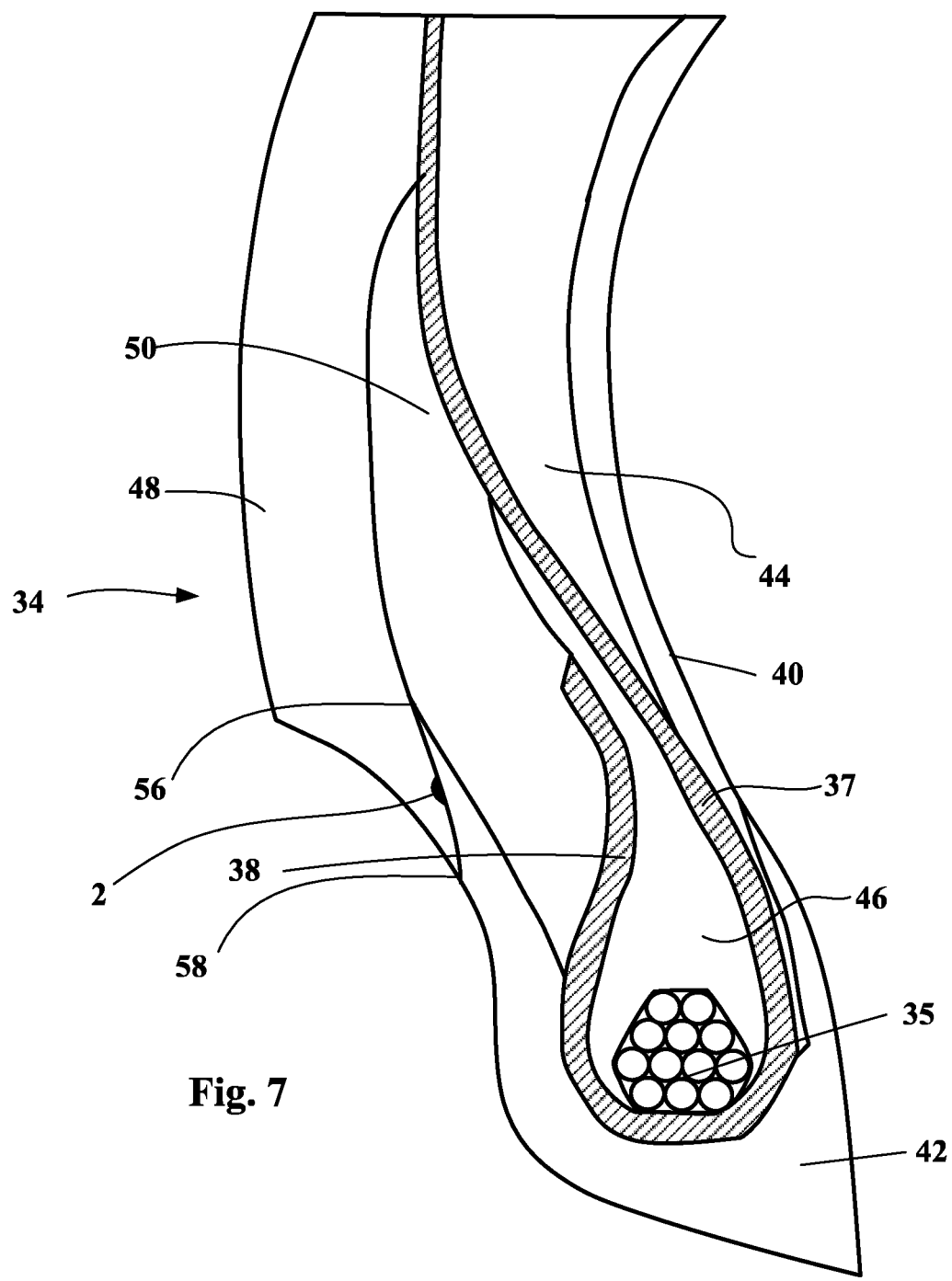

FIG. 7 shows a bead 34 and one portion of the sidewall of a run-flat tyre, the structure of which is identical to that of the bead and of the portion of the sidewall of FIG. 2. The radially internal end of the sidewall rubber 48 is referenced 58 and the axially and radially external end of the protector rubber 42 is referenced 56.

In this example, the sidewall 33 comprises a sidewall rubber 48 and the bead comprises a protector rubber 42. The protector rubber 42 extends axially on either side of the bead wire to two radially external ends. The axially external end 56 of the protector rubber placed axially internally relative to the sidewall rubber 48 and extending radially beyond the radially internal end 58 of the sidewall rubber, the electronic device is placed at the interface between the sidewall rubber 48 and the protector rubber 42.

Figure 13:
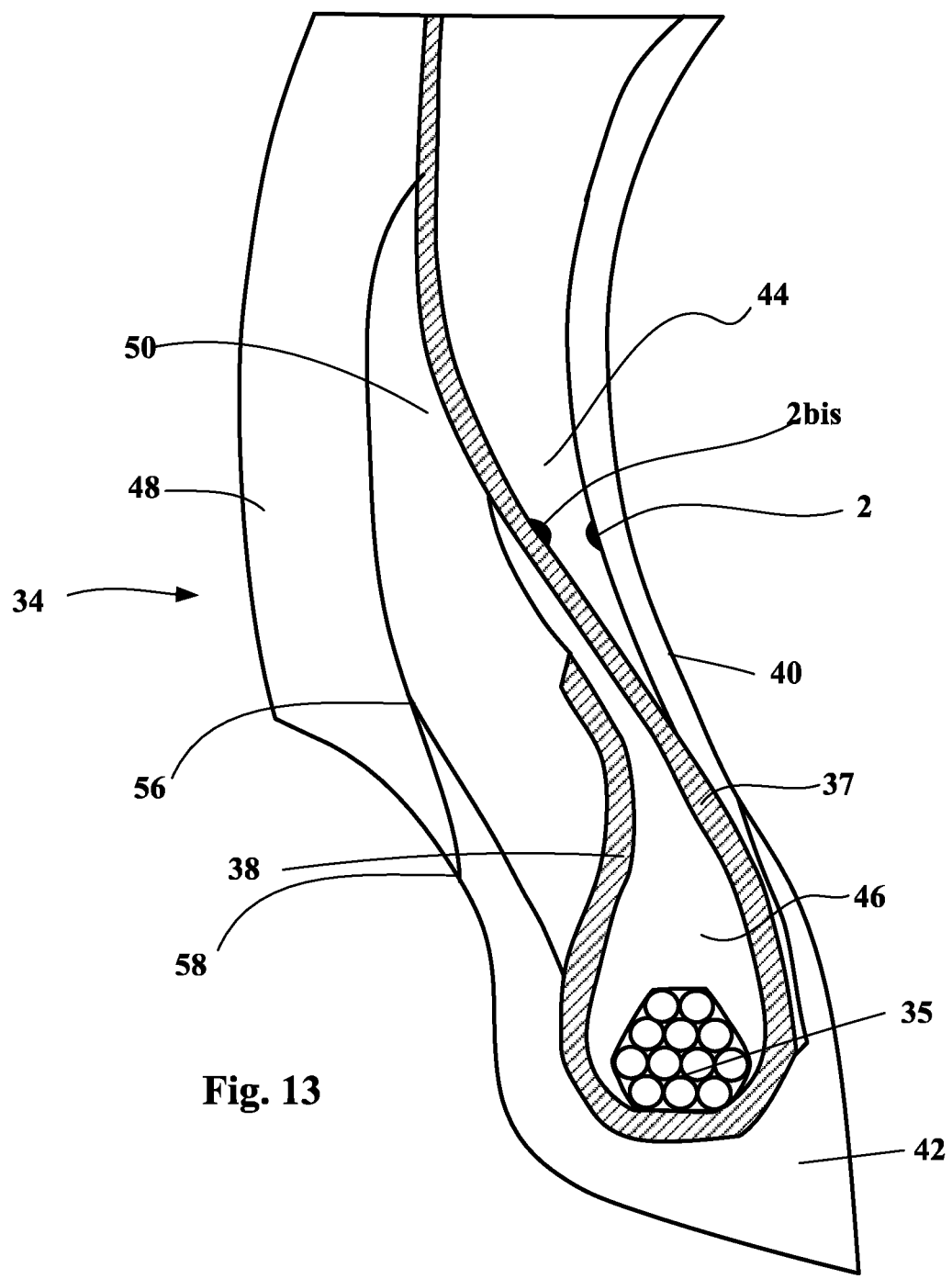

FIG. 13 shows a bead 34 and one portion of the sidewall of a run-flat tyre, the structure of which is identical to that of the bead and of the portion of the sidewall of FIG. 2.

In this example, two electronic-device positions have been indicated. These two positions are axially internal and external to the sidewall insert 44. The electronic device 2 is placed at the interface between the sidewall insert 44 and the inner liner 40. The electronic device 2b is placed at the interface between the sidewall insert 44 and the carcass ply 37 of the carcass reinforcement.

Figure 8:
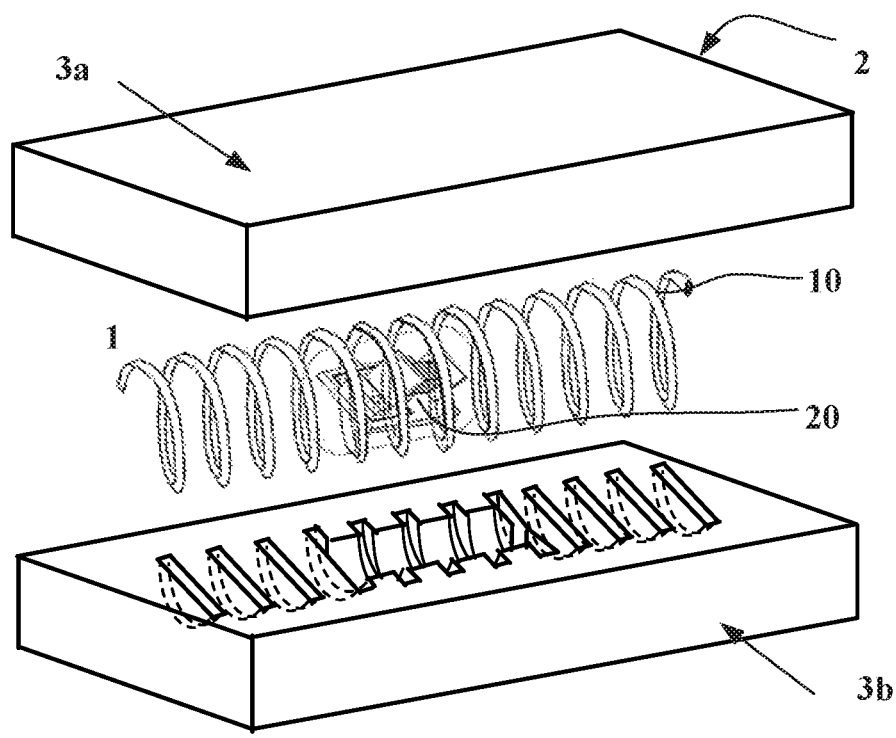
FIG. 8 is a schematic exploded view of an electronic device.

FIG. 8 is a exploded view of an electronic device 2. This device 2 comprises a radiofrequency transponder 1 embedded between two layers 3a and 3b of a non-vulcanized electrically insulating elastomer blend. Such an electronic device is a semi-finished product able to be integrated into the structure of a tyre during the manufacture thereof.

The encapsulating elastomer blend contains 100 phr (parts per 100 parts of elastomer by mass) of a polymer such as EPDM (ethylene propylene diene monomer rubber), butyl rubber, neoprene or a diene elastomer such as SBR (styrene-butadiene rubber), polybutadiene, natural rubber or polyisoprene.

The blend may contain fillers such as fillers of silica, carbon black, chalk and kaolin type:
  with a filler of silica type in a maximum amount of 50 phr;
  with a filler of the type consisting of carbon black of ASTM grade higher than 700, in an amount lower than 50 phr;
  with a filler of the type consisting of carbon black of grade lower than or equal to 500, in a maximum amount of 20 phr.

It is possible to add or replace these fillers with chalk or kaolin.

Such amounts and types of fillers make it possible to guarantee a relative permittivity lower than 6.5, in particular at a frequency of 915 MHz.

The stiffness in the cured state of the encapsulating blend is preferably lower than or close to those of the adjacent blends.

In a first embodiment, the radiofrequency transponder of the electronic device 2 is a conventional radiofrequency transponder, such as described in document WO 2012/030321 A1. This transponder comprises an electronic chip fastened to a carrier or printed circuit board (PCB) and galvanically connected to two half-antennas. The antennas are helical springs the solid core of which is a steel wire.

The radiofrequency transponder 1 of the electronic device 2 such as shown in FIG. 8 corresponds to a second embodiment of the electronic device 2 that will now be described.

The radiofrequency transponder 1 according to the second embodiment of the electronic device 2 comprises an electronic chip 22 and a radiating antenna 10 able to communicate with an external radiofrequency reader. It in addition comprises a primary antenna 24 electrically connected to the electronic chip 22 and inductively coupled to the radiating antenna 10. The radiating antenna is a dipole antenna consisting of a single-strand helical spring defining a first longitudinal axis.

Figure 9:
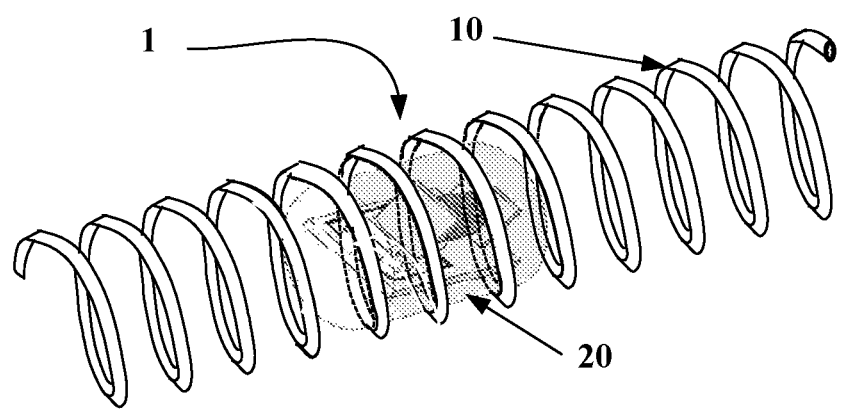
FIG. 9 is a perspective view of a radiofrequency transponder according to one embodiment of the invention in a configuration in which the electronic portion is located in the interior of the radiating antenna.

FIG. 9 shows a radiofrequency transponder 1 in a configuration in which the electronic portion 20 is located in the interior of the radiating antenna 10. The geometric shape of the electronic portion 10 is circumscribed in a cylinder the diameter of which is smaller than or equal to the inside diameter 13 of the helical spring. The introduction of the electronic portion 20 into the radiating antenna 10 is facilitated thereby. The median plane 21 of the primary antenna is located in the central zone of the radiating antenna and substantially superposed on the median plane 19 of the radiating antenna 10.

Figure 10:
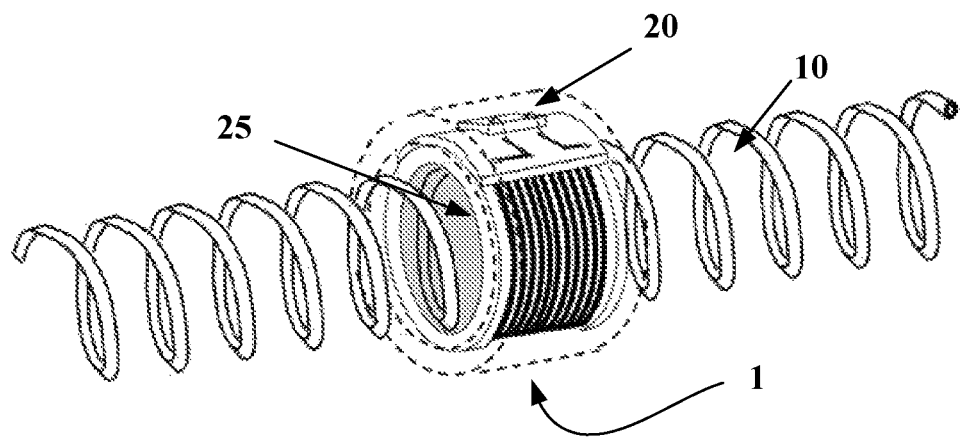
FIG. 10 is a perspective view of a radiofrequency transponder according to the invention in a configuration in which the electronic portion is located on the exterior of the radiating antenna.

FIG. 10 shows a radiofrequency transponder 1 in a configuration in which the electronic portion 20 is located on the exterior of the radiating antenna 10. The geometric shape of the electronic portion 20 has a cylindrical cavity 25 the diameter of which is larger than or equal to the outside diameter 15 of the radiating antenna 10. The introduction of the radiating antenna 10 into the cylindrical cavity 25 of the electronic portion is thus facilitated thereby. The median plane 21 of the primary antenna is located in the central zone of the radiating antenna and substantially in line with the median plane 19 of the radiating antenna 10.

Figure 11:
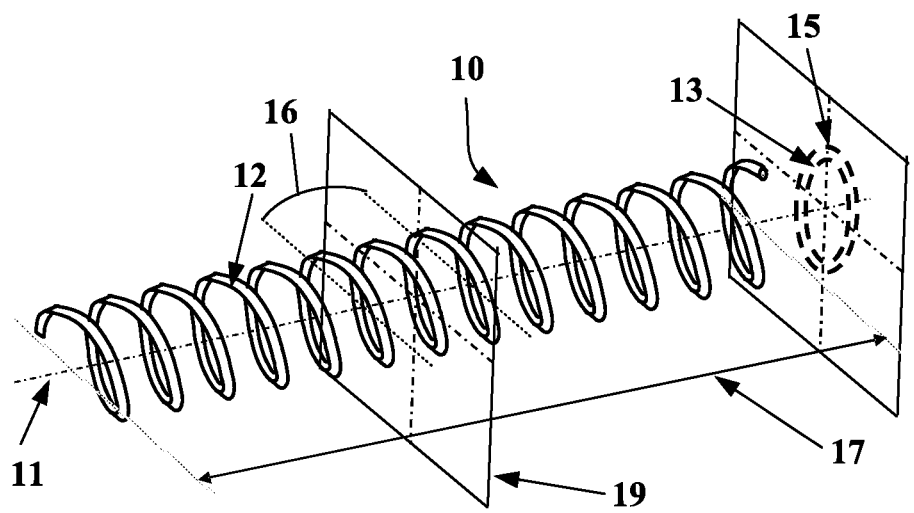
FIG. 11 is a detail view of a radiating antenna of a radiofrequency transponder according to one embodiment of the invention.

FIG. 11 shows a radiating antenna 10 consisting of a steel wire 12 that has been plastically deformed in order to form a helical spring having an axis of revolution 11. This steel wire is coated with a conduction layer made of copper, aluminium, silver, zinc or brass covered if necessary with a chemically insulating layer for example made of brass, zinc, nickel or tin in order to protect the rubber blend from the material of the conduction layer.

The electromagnetic conduction of such an antenna occurs mainly via a skin effect, i.e. it mainly occurs in the exterior layers of the antenna. This thickness of skin is in particular dependent on the function of the frequency of the radiation and of the material from which the conduction layer is made. By way of example, for a UHF frequency (for example 915 MHz), the skin thickness is about 2.1 µm for silver, 2.2 µm for copper, and 4.4 µm for brass.

The steel wire may be coated with these layers then formed; alternatively it may also be formed then coated.

The helical spring is primarily defined by a winding diameter of the coated wire and by a helix pitch. Thus, given the diameter of the wire, the inside diameter 13 and outside diameter 15 of the helical spring may be precisely determined. The length of the spring 17 here corresponds to one half-wavelength of the transmission signal of the radiofrequency transponder 1 in a rubber mass. It is furthermore possible to define a median plane 19 of the helical spring perpendicular to the axis of revolution 11 separating the radiating antenna into two equal portions. This plane is in the middle of the central zone 16 of the radiating antenna, this central zone 16 corresponding to about 25% of the total length of the antenna and preferably 15%.

Figure 12:
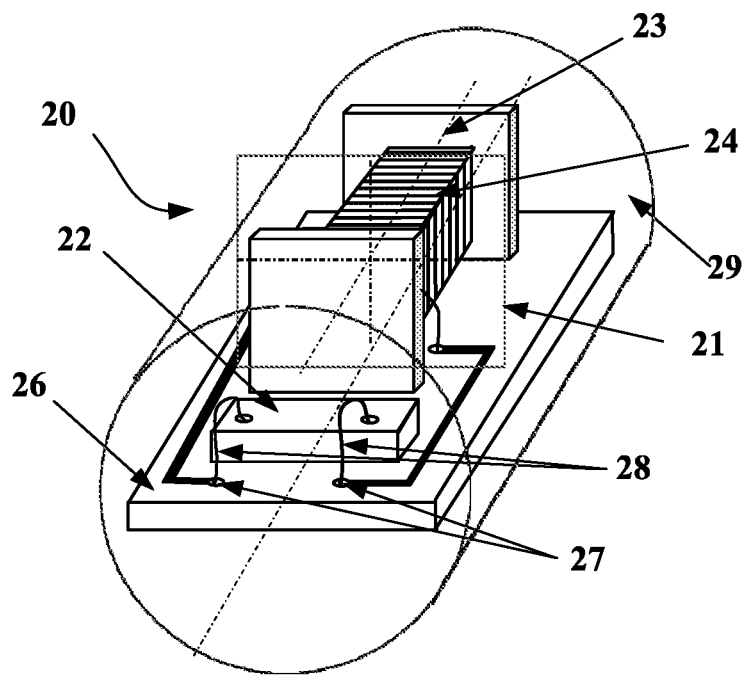
FIG. 12 is a perspective view of the electronic portion of a radiofrequency transponder in a configuration in which the electronic portion is located in the interior of the radiating antenna.

FIG. 12 shows the electronic portion 20 of a radiofrequency transponder 1 intended for a configuration in which the electronic portion 20 is located in the interior of the radiating antenna 10. The electronic portion 20 comprises an electronic chip 22 and a primary antenna 24 that is electrically connected to the electronic chip 22 via a printed circuit board 26. The primary antenna here consists of a surface-mount-device (SMD) microcoil having an axis of symmetry 23. The median plane 21 of the primary antenna is defined by a normal parallel to the axis of symmetry 23 of the SMD coil and separates the coil into two equal portions. The components on the printed circuit board are electrically connected using tracks made of copper terminated by copper pads 27. The components on the printed circuit board are electrically connected using the wire-bonding technique by gold wires 28 running between the component and the pads 27. The assembly consisting of the printed circuit board 26, the electronic chip 22 and of the primary antenna 24 is embedded in a rigid mass 29 made of electrically insulating high-temperature epoxy resin, and forms the electronic portion 20 of the radiofrequency transponder 1.

This radiofrequency transponder 1 has the advantage of being much more mechanically resistant than conventional transponders and thus is particularly suitable for a hostile use such as encountered with run-flat tyres.

The invention claimed is:

1. A tire suitable for running flat comprising a crown, two sidewalls and two beads, a carcass reinforcement with at least one carcass ply anchored in each bead and a sidewall insert placed axially internally relative to the at least one carcass ply, wherein the tire is equipped with an electronic device comprising at least one radiofrequency transponder, wherein the radiofrequency transponder comprises an electronic chip and a radiating antenna configured to communicate with an external radiofrequency reader, wherein the radiofrequency transponder of the electronic device further comprises a primary antenna electrically connected to the electronic chip, wherein the primary antenna is inductively coupled to the radiating antenna, wherein the radiating antenna is a dipole antenna consisting of a single-strand helical spring defining a first longitudinal axis, wherein the primary antenna is a coil having at least one turn defining a second longitudinal axis that is circumscribed in a cylinder, an axis of revolution of which is parallel to the second longitudinal axis and a diameter of which is between one third and three times an average diameter of the helical spring of the radiating antenna, wherein the radiating antenna has a central zone between two lateral zones which corresponds to 25% or less of a total length of the radiating antenna and the primary antenna has a median plane perpendicular to the second longitudinal axis, the first and second longitudinal axes are parallel to each other and the median plane of the primary antenna is placed in the central zone of the radiating antenna, wherein each bead comprises a bead wire of revolution about a reference axis with H being a point of the bead wire closest to the axis of revolution, wherein the electronic device is placed axially in a zone of the tire bounded by at least one of the beads and one of the sidewalls and radially externally at a radial distance larger than 20 mm from point H, and wherein the tire is a run-flat tire.

2. The tire according to claim 1, wherein the electronic device is placed radially externally at a radial distance smaller than 50 mm from point H.

3. The tire according to claim 1, wherein the electronic device is placed radially externally at a radial distance of between 30 mm and 40 mm from point H.

4. The tire according to claim 1, wherein the carcass reinforcement comprises a carcass ply with a turn-up about each of the bead wires and the turn-up has an axially external end, and wherein the electronic device is placed radially externally at a distance larger than 5 mm from the axially external end of one of the turn-ups.

5. The tire according to claim 1, wherein each bead comprises a filling rubber extending radially externally relative to the bead wire, wherein the carcass reinforcement comprises a carcass ply with a turn-up about each of the bead wires and the filling rubber extends radially beyond the axially external end of the turn-up, and wherein the electronic device is placed axially externally relative to the carcass reinforcement and radially at a radial distance larger than 5 mm from the a radially external end of the filling rubber.

6. The tire according to claim 1, wherein, each bead comprising a first and a second filling rubber extending radially externally relative to the bead wire, the second filling rubber being placed axially externally relative to the first, the carcass reinforcement comprising a carcass ply with a turn-up about each of the bead wires and extending radially between the first and second filling rubbers, the electronic device is placed axially externally relative to the second filling rubber.

7. The tire according to claim 6, wherein, the sidewall comprising a sidewall rubber placed at least partially axially externally relative to the second filling rubber, the electronic device is placed at an interface between the sidewall rubber and the second filling rubber.

8. The tire according to claim 1, wherein the electronic device consists of the radiofrequency transponder encapsulated in at least one electrically insulating encapsulating rubber mass.

9. The tire according to claim 8, wherein an elastic modulus of the encapsulating rubber mass is lower than or equal to an elastic modulus of adjacent rubber blends.

10. The tire according to claim 1, wherein the diameter of the cylinder is between half and two times the average diameter of the helical spring of the radiating antenna.

11. The tire according to claim 1, wherein the primary antenna is placed in an interior of the single-strand helical spring of the radiating antenna.

* * * * *